United States Patent

Hellerbach et al.

[15] 3,671,518

[45] June 20, 1972

[54] BENZODIAZEPIN-2-ONES AND PROCESSES FOR THEIR PREPARATION

[72] Inventors: Joseph Hellerbach; Andre Szente, both of Basel, Switzerland; Armin Walser, West Caldwell, N.J.

[73] Assignee: Hoffmann-La Roche Inc., Nutley, N.J.

[22] Filed: March 6, 1970

[21] Appl. No.: 17,318

[30] Foreign Application Priority Data

March 13, 1969 Switzerland ..........................3784/69
April 30, 1969 Switzerland ..........................6595/69

[52] U.S. Cl. ......................260/239.3 D, 424/244, 424/248, 424/250, 424/267, 260/562, 260/566, 260/570, 260/475, 260/471, 260/287
[51] Int. Cl. ......................................................C07d 53/06
[58] Field of Search ..........................................260/239.3 D

[56] References Cited

UNITED STATES PATENTS

| | | | |
|---|---|---|---|
| 3,299,053 | 1/1967 | Archer et al. | 260/239.3 D |
| 3,371,085 | 2/1968 | Reeder et al. | 260/239.3 D |
| 3,391,138 | 7/1968 | Archer et al. | 260/239.3 D |
| 3,410,844 | 11/1968 | McCaully | 260/239.3 D |
| 3,450,695 | 6/1969 | Sternbach et al. | 260/239.3 D |
| 3,475,415 | 10/1969 | Hellerbach et al. | 260/239.3 D |
| 3,516,988 | 6/1970 | Schmitt | 260/239.3 D |

OTHER PUBLICATIONS

Noller " Chemistry of Organic Compounds" 2nd Edition, pages 170–171 (Saunders) (1957)

*Primary Examiner*—Henry R. Jiles
*Assistant Examiner*—Robert T. Bond
*Attorney*—Samuel L. Welt, Jon S. Saxe, Bernard S. Leon and William G. Isgro

[57] ABSTRACT

3-substituted benzodiazepin-2-ones, derivatives thereof and processes for their preparation are described. These compounds are useful as anti-convulsants, muscle relaxants and sedatives.

16 Claims, No Drawings

BENZODIAZEPIN-2-ONES AND PROCESSES FOR THEIR PREPARATION

DESCRIPTION OF THE INVENTION

The present invention relates to novel chemical compounds and to processes for the preparation thereof, said compounds having valuable therapeutic properties. More particularly, the present invention is concerned with new benzodiazepine derivatives selected from the group consisting of a compound of the formula

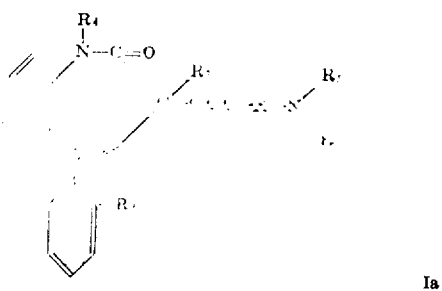

Ia wherein X signifies an alkylene group containing from two to six carbon atoms; $R_1$ signifies halogen or nitro; $R_2$ signifies hydrogen or halogen; $R_3$ signifies hydrogen or hydroxy; $R_4$ signifies hydrogen, lower alkyl, lower alkoxy-lower alkyl, hydroxy-lower alkyl, or di-lower alkylamino-lower alkyl; $R_5$ signifies lower alkyl; $R_6$ signifies hydrogen or lower alkyl; or $R_5$ and $R_6$ taken together with the nitrogen atom joining them, signify a five or six membered heterocyclic ring containing at the most one further hetero atom selected from the group consisting of an oxygen or nitrogen atom, which nitrogen atom can be substituted with a lower alkyl group
a compound of the formula

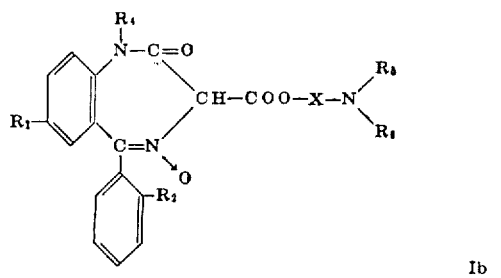

Ib wherein X signifies an alkylene group containing from two to six carbon atoms; $R_1$ signifies halogen or nitro; $R_2$ signifies hydrogen or halogen; $R_4$ signifies hydrogen, lower alkyl, lower alkoxy-lower alkyl, hydroxy-lower alkyl, or di-lower alkylamino-lower alkyl; $R_5$ signifies lower alkyl; $R_6$ signifies hydrogen or lower alkyl; or $R_5$ and $R_6$ taken together with the nitrogen atom joining them, signify a five or six membered heterocyclic ring containing at the most one further hetero atom selected from the group consisting of an oxygen or nitrogen atom, which nitrogen atom can be substituted with a lower alkyl group
and the pharmaceutically acceptable salts thereof.

As used herein, either alone or in combination such as in amino-lower alkyl, the term "lower alkyl" comprehends straight or branched chain hydrocarbon groups having from one to seven carbon atoms, preferably from one to four carbon atoms, such as methyl, ethyl, propyl, isopropyl and the like. The term "alkylene" is intended to connote a bivalent organic radical derived from a saturated aliphatic hydrocarbon and comprehends straight or branched chain bivalent aliphatic groups containing from two to six carbon atoms, such as, for example, ethylene, propylene, trimethylene, tetramethylene, 1,1-dimethylbutylene and the like. The term "halogen" represents all four forms thereof, i.e. fluorine, chlorine, bromine and iodine unless expressly indicated otherwise. The term "low alkoxy" designates straight or branched chain saturated hydrocarbonoxy groups containing from one to seven carbon atoms, preferably from one to four carbon atoms, such as methoxy, ethoxy, propoxy and the like.

In a preferred aspect the heterocyclic ring is saturated and thus $R_5$ and $R_6$, when taken together with the nitrogen and at the most one further hetero atom, represent a member selected from the group consisting of N-lower alkyl piperazinyl, pyrrolidinyl, piperazinyl, morpholino and piperidino.

A preferred group of compounds falling within the purview of the present invention are those wherein $R_1$ signifies chlorine or nitro and $R_2$ signifies hydrogen, chlorine or fluorine; i.e. compounds of the formula

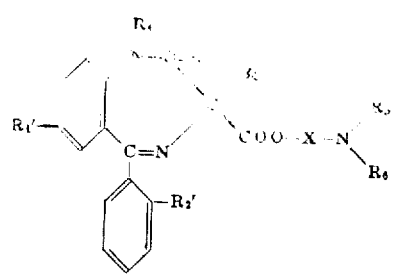

Ic wherein $R_1'$ signifies chlorine or nitro; $R_2'$ signifies hydrogen, chlorine or fluorine; and $R_3$ through $R_6$ and X are as described above
or compounds of the formula

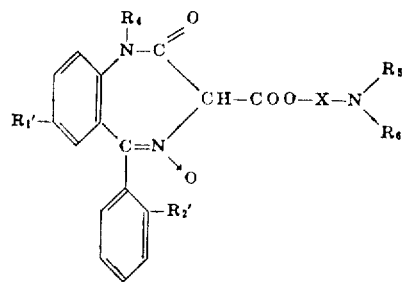

Id wherein $R_1'$ signifies chlorine or nitro; $R_2'$ signifies hydrogen, chlorine or fluorine; and $R_4$ through $R_6$ and X are as described above
and the pharmaceutically acceptable salts thereof.

Another preferred class of compounds falling within the scope of the present invention are those wherein $R_1$ signifies chlorine or nitro; $R_2$ signifies hydrogen, chlorine or fluorine; $R_3$ signifies hydrogen; $R_4$ signifies hydrogen, lower alkyl, preferably methyl, or lower alkoxy-lower alkyl, preferably methoxy-methyl, and X signifies ethylene, trimethylene, tetramethylene or the group

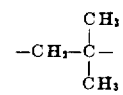

i.e. compounds of the formula

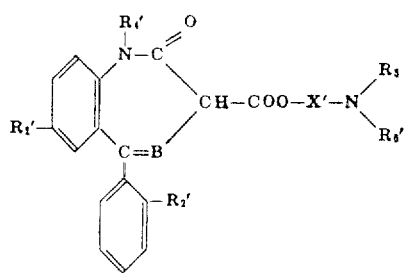

Ie wherein $R_4'$ signifies hydrogen, lower alkyl, preferably methyl, or lower alkoxy-lower alkyl, preferably methoxymethyl; X' signifies ethylene, trimethylene, tetramethylene, or the grouping

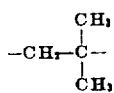

B signifies N or N→O; and $R_1'$, $R_2'$, $R_5$ and $R_6$ are as described above
and the pharmaceutically acceptable salts thereof.

Another preferred class of compounds falling within the scope of the present invention are those wherein $R_1$ signifies chlorine or nitro; $R_3$ and $R_4$ each signify hydrogen; X signifies ethylene or trimethylene; and $R_5$ and $R_6$ each signify methyl, ethyl or taken together signify morpholino, i.e. a compound of the formula

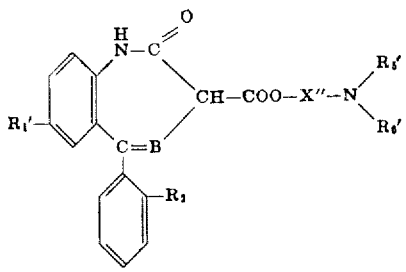

wherein $R_1'$, $R_2$ and B are as described above; X'' signifies ethylene or trimethylene; and $R_5'$ and $R_6'$ each signify methyl, ethyl or taken together signify morpholino
and the pharmaceutically acceptable salts thereof.

Most preferred of the compounds of formulas 1a or 1b are:
3-diethylaminopropyl 7-chloro-2,3-dihydro-2-oxo-5-(2-chlorophenyl)-1H-1,4-benzodiazepine-3 carboxylate;
3-diethylaminopropyl 7-chloro-2,3-dihydro-2-oxo-5-phenyl-1H-1,4-benzodiazepine-3-carboxylate;
3-morpholinopropyl 5-(2-chlorophenyl)-2,3-dihydro-7-nitro-2-oxo-1H-1,4-benzodiazepine-3-carboxylate;
3-diethylaminopropyl 7-chloro-2,3-dihydro-1-methyl-2-oxo-5-phenyl-1H-1,4-benzodiazepine-3-carboxylate;
2-(dimethylamino)-2-methyl-propyl 7-chloro-2,3-dihydro 2-oxo-5-phenyl-1H-1,4-benzodiazepine-3-carboxylate;
3-diethylaminopropyl 2,3-dihydro-7-nitro-2-oxo-5-phenyl-1H-1,4-benzodiazepine-3-carboxylate;
2-morpholinoethyl-5-phenyl-2,3-dihydro-7-chloro-2-oxo-1H-1,4-benzodiazepine-3-carboxylate;
3-morpholinopropyl 7-nitro-5-(o-chlorophenyl)-2,3-dihydro-1-methyl-2-oxo-1H-1,4-benzodiazepine-3-carboxylate;
3-morpholinopropyl 7-nitro-5-(o-chlorophenyl)-2,3-dihydro-1-methoxy methyl-2-oxo-1H-1,4-benzodiazepine-3-carboxylate.

The novel compounds of formulas 1a and 1b above can be prepared following a variety of synthetic routes.

A. In one process aspect of the present invention, the novel compounds of formulas Ia and Ib can be prepared by reacting a compound of the general formula

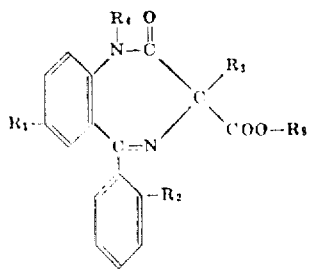

wherein $R_1$, $R_2$, $R_3$ and $R_4$ are as described above; $R_8$ signifies lower alkyl or lower alkoxycarbonyl; and where, when $R_3$ signifies hydrogen, the nitrogen atom in the 4-position can carry an oxygen atom
with a compound of the general formula

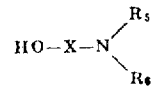

wherein X, $R_5$ and $R_6$ are as described above.

The reaction of a compound of formula II wherein $R_8$ is lower alkyl with a compound of formula III is expediently carried out using an excess of the formula III compound in which case this compound can also serve as the solvent. However, the reaction can also be effected in the presence of an inert organic solvent. Suitable solvents for this purpose include hydrocarbons such as benzene, toluene and the like. Temperature and pressure are not critical to this process aspect; however the reaction is expediently effected at temperatures between 0° and the reflux temperature of the reaction mixture and for reasons of convenience at normal pressure. In addition the reaction can be effected in the presence of a catalyst such as sodium, sodium methoxide and the like.

The reaction of a compound of formula II wherein $R_8$ is lower alkoxycarbonyl with an alcohol of formula III is expediently effected in the presence of an inert organic solvent. Suitable solvents for this purpose include hydrocarbons such as benzene, toluene and the like; and chlorinated hydrocarbons such as methylene chloride, chloroform and the like. This reaction is expediently effected using temperatures in a range of from about −10° C to room temperature.

The compounds of formula II above wherein $R_8$ is lower alkyl are known or can be readily prepared by procedures analogous to those followed in the preparation of the known compounds. The compounds of formula II wherein $R_8$ is lower alkoxycarbonyl can be obtained from the corresponding compounds of formula II wherein $R_8$ is lower alkyl by saponifying said compounds, for example with an alkali metal hydroxide. Thereafter, the alkali metal salt of the benzodiazepine-3-carboxylate so obtained is reacted with chloroformic acid ester. This reaction with the chloroformic acid ester is expediently effected in the presence of an inert organic solvent. Suitable solvents include hydrocarbons such as benzene, toluene and the like, and chlorinated hydrocarbons such as methylenechloride, chloroform and the like and at temperatures between about −10° C and room temperature.

Examples of compounds of formula III suitable for the purpose of this process aspect include 1-diethylamino-ethanol, 1-diethylaminopropanol, 1-morpholinopropanol and the like.

B. In a further process aspect of the present invention, a compound of the general formula

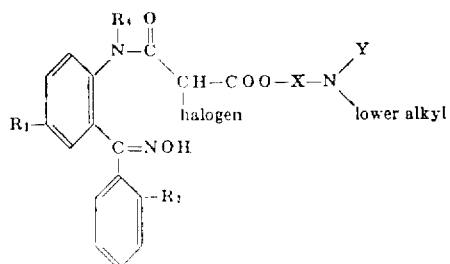

wherein $R_1$, $R_2$, $R_4$ and X are as described above; and Y signifies any suitable protecting group, preferably a carbobenzoxy or trityl group
is cyclized and subsequently the protecting group is split off to yield a compound of the formula

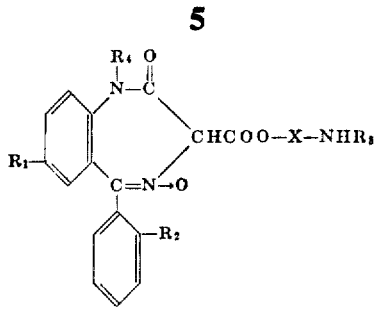

Ig wherein $R_1$, $R_2$, $R_4$, $R_5$ and X are as described above.

The cyclization of an oxime of formula IV above can, for example, be achieved by treating said compound with an organic base. Suitable organic bases for this purpose include pyridine, triethylamine and the like. The reaction is expediently effected in the presence of an inert organic solvent such as hydrocarbons, i.e. benzene, toluene and the like. Suitable temperatures for effecting cyclization of a compound of formula IV are in the range of from about 0° C to about 80° C.

The protecting group Y found in the oxime of formula IV is preferably a carbobenoxy group, a trityl group or any similar group which is capable of being readily split off. The splitting off of a carbobenzoxy group can be effected following conventional techniques, as for example with a hydrohalic acid in glacial acetic acid. This reaction is expediently effected in the presence of an organic solvent such as hydrocarbons, i.e. benzene, toluene and the like, chlorinated hydrocarbons, i.e. carbon tetrachloride, glacial acetic acid and the like and at temperatures between about −20° C and room temperature. A trityl protecting group can, for example, be split off using acetic acid or a haloacetic acid such as trifluoroacetic acid under mild conditions, i.e. at room temperature or below.

The oximes of formula IV can be manufactured by reacting a β-oxime of the general formula

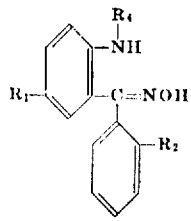

IVa wherein $R_1$, $R_2$ and $R_4$ are as described above with a compound of the general formula

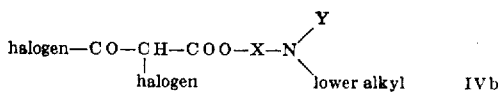

IVb wherein X and Y are as described above.

The reaction between compounds of formulas IVa and IVb above is expediently carried out in the presence of an acid acceptor and in the presence of an inert organic solvent. Suitable solvents include chlorinated hydrocarbons, such as methylene chloride and the like and ethers, such as dioxane. The reaction is carried out at temperatures between about 0° C and room temperature. In addition, the reaction can be carried out using two phases, for example, in methylene chloride/bicarbonate solution.

C. In a further process aspect of the present invention, compounds of formulas Ia or Ib above wherein the $R_4$ substituent is other than hydrogen can be prepared by introducing a lower alkyl, lower alkoxy-lower alkyl, hydroxy-lower alkyl, or di-lower alkylamino-lower alkyl group into the 1-position of a compound of the general formula

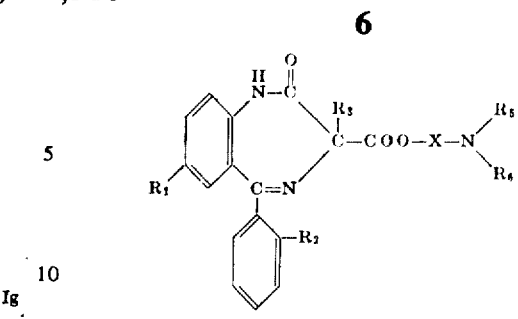

V wherein $R_1$, $R_2$, $R_3$, $R_5$, $R_6$ and X are as described above, and where, in the case that $R_3$ is hydrogen, the nitrogen atom in the 4-position can carry an oxygen atom.

The introduction of a lower alkyl group, a lower alkoxy-lower alkyl group, a hydroxy-lower alkyl group or a di-lower alkylamino-lower alkyl group into a compound of formula V is effected by reacting the formula V compound with a compound of the formula $$Z - R_4''$$

wherein Z signifies halogen, a lower alkylsulfonyl group, preferably mesyl, or an arylsulfonyl group, preferably tosyl; and $R_4''$ signifies lower alkyl, lower alkoxy-lower alkyl, hydroxy-lower alkyl, or di-lower alkylamino-lower alkyl.

Examples of compounds of the formula $Z-R_4''$ which are suitable for the purposes of this process aspect include methyl bromide, ethyl chloride, methoxy methyl bromide, hydroxy ethyl bromide or diethylaminoethyl chloride.

This reaction is expediently effected in the presence of an inert organic solvent such as dimethylformamide, hydrocarbons such as benzene, toluene and the like and at temperatures between about −40° C to the reflux temperature of the reaction mixture. It is expedient to first transform the formula V compound into the 1-alkali metal derivative thereof by treating said compound with an alkali amide, i.e. lithium amide, an alkali hydride, i.e. lithium amide, an alkali hydride, i.e. sodium hydride, or an alkali alcoholate, i.e. sodium methoxide. In addition, a lower alkyl group can also be introduced by conventional alkylating agents such di-alkyl sulfates, such as dimethyl sulfate, diazoalkanes, such as diazomethane and the like. Compounds of formula V can be prepared following the procedures set forth in process aspect A described above.

D. In a further process aspect of the present invention, compounds of formula Ia wherein the $R_3$ substituent is hydrogen can be prepared by deoxidizing a compound of the general formula

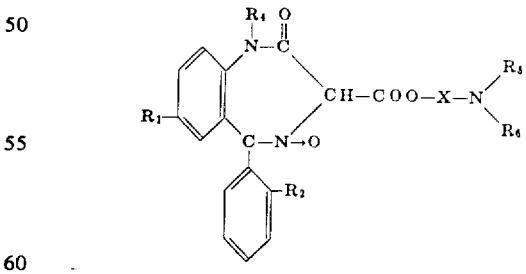

VI wherein X, $R_1$, $R_2$, $R_4$, $R_5$ and $R_6$ are as described above.

The deoxidation of a compound of formula VI can be carried out by treating said compound with a phosphorus trihalide such as phosphoros trichloride. This reaction is expediently carried out in the presence of an organic solvent such as hydrocarbons, i.e. benzene, toluene, chlorinated hydrocarbons, i.e. carbon tetrachloride and the like and at room temperature, although temperatures above and below room temperature can likewise be employed.

Alternately, the deoxidation of a compound of formula VI wherein the $R_1$ substituent is halogen can be carried out by hydrogenation in the presence of a hydrogenation catalyst such as Raney Nickel. The reaction is expediently effected in the presence of an inert organic solvent such as dioxane, dimethoxyethane, ethyl acetate and the like and at room temperature although temperatures above and below room temperature can also be employed. In addition, the reaction can be carried out under pressure.

The compounds of formula VI can be prepared following the procedures described for process aspect A above.

E. In a further process aspect of the present invention, a compound of the general formula

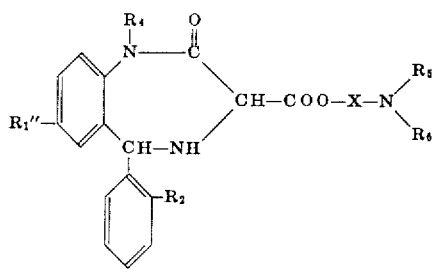

VII wherein $R_1''$ signifies halogen and $R_2$, $R_4$, $R_5$, $R_6$ and X are as described above
can be dehydrogenated or oxidized at the 4,5-bond to yield a compound of the formula

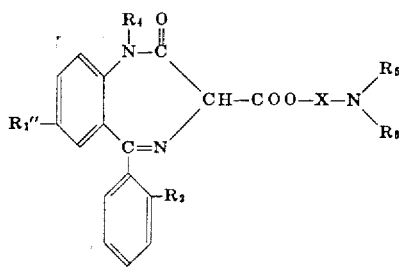

Ih wherein $R_1''$, $R_2$, $R_4$, $R_5$, $R_6$ and X are as described above.

The dehydrogenation or oxidation of a compound of formula VII can, for example, be effected with oxygen, manganese dioxide, bromine, chlorine, azodicarboxylic acid esters, (i.e. the diethyl ester) and the like. The reaction is expediently carried out in the presence of an inert organic solvent such as hydrocarbons i.e. benzene, toluene and the like; halogenated hydrocarbons, i.e. carbon tetrachloride; ethers, i.e. dioxane, tetrahydrofuran and the like and advantageously at a temperature between about −40° C and room temperature. The compounds of formula VII can be prepared by re-esterifing the corresponding 4,5-dihydro derivative of a compound of formula II with a compound of formula III. This reaction can be effected following the reaction conditions set forth in process aspect A above. Compounds of formula VII can also be obtained from the corresponding 4-oxides of the compounds of formula VI, for example by catalytic reduction. F. In a further process aspect of the present invention, compounds of formula Ia may be prepared by cyclizing a compound of the general formula

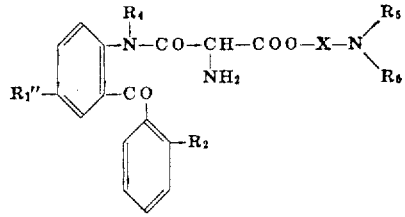

VIII wherein X, $R_1''$, $R_2$, $R_4$, $R_5$ and $R_6$ are as described above.

The cyclization of a compound of formula VIII is expediently effected in the presence of an inert, organic solvent. Suitable solvents for this purpose include hydrocarbons such as benzene, toluene and the like. The reaction is effected under very mild conditions, for example in benzene/glacial acetic acid. Temperature and pressure are not critical factors and the reaction is usually carried out at temperatures between room temperature and the reflux temperature of the reaction mixture.

The compounds of formula VIII can be prepared by reacting a 2-aminobenzophenone of the general formula

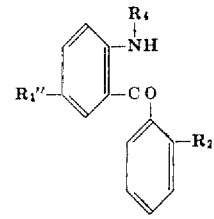

VIIIa wherein $R_1''$, $R_2$ and $R_4$ as described above with a compound of the general formula halogen—CO—CH$_2$—COO—lower alkyl    VIIIb The reaction of the benzophenone of formula VIIIa with a malonic acid ester half-halide of formula VIIIb is expediently effected in the presence of an inert organic solvent. Suitable solvents for this purpose include hydrocarbons, such as benzene and toluene; chlorinated hydrocarbons, such as methylene chloride; ethers, such as dioxane and the like. Suitable temperatures are in the range of from about −40° C. to about the reflux temperature of the reaction mixture. Further, the reaction can be performed in the presence or absence of an acid acceptor. Suitable acid acceptors are for example bicarbonates, such as sodium bicarbonate; carbonates, such as sodium carbonate; triethylamine and the like.

The reaction between compounds of formulas VIIIa and VIIIb above results in the formation of a compound of the formula

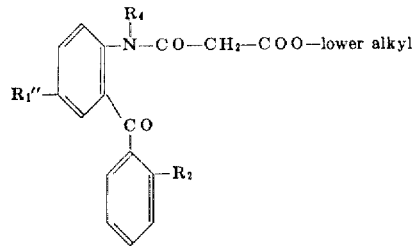

VIIIc wherein $R_1''$, $R_2$ and $R_4$ are as described above.

The Formula VIIIc compound so obtained is then nitrated or nitrosated to yield a compound of the formula

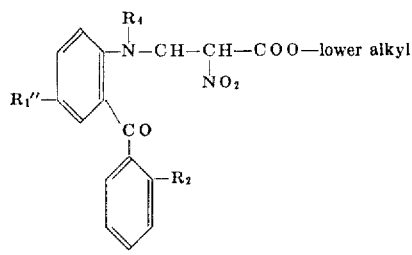

VIIId or a compound of the formula

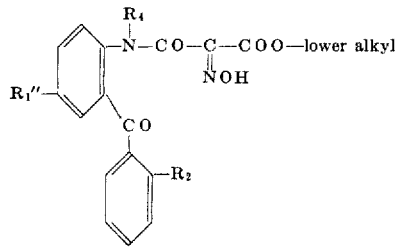

VIIId' wherein $R_1''$, $R_2$ and $R_4$ are as described above.

The nitration or nitrozation of a compound of formula VIIIc above is expediently effected with nitric acid or a nitrite in acidic solution, i.e. sodium nitrite in glacial acetic acid. The reaction is usually effected at room temperature, although, temperatures above and below room temperature may also be employed. This reaction is expediently carried out in the presence of an organic solvent. Suitable solvents include glacial acetic or glacial acetic acid in admixture with hydrocarbons, such as benzene, toluene or chlorinated hydrocarbons, such as methylene chloride and the like.

The compound of formula VIIId or formula VIIId' so obtained is then re-esterified with a compound of the general formula

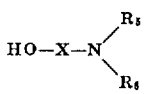

VIIIe wherein X, $R_5$ and $R_6$ are as described above to yield a compound of the general formula

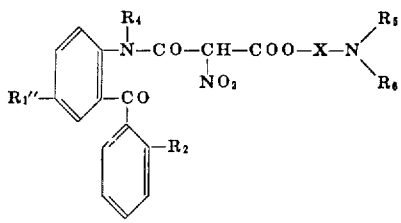

VIIIf or a compound of the general formula

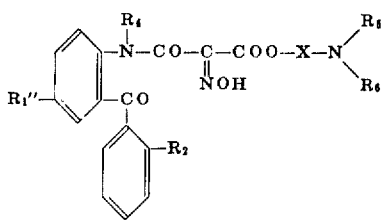

VIIIf' wherein $R_1''$, $R_2$, $R_4$, $R_5$, $R_6$ and X are as described above.

The re-esterification of a compound of formula VIIId or VIIId' with a compound of formula VIIIe is expediently effected using an excess of an alcohol of formula VIIIe in which case this alcohol can also serve as the solvent. However, the reaction can also be effected in the presence of an inert organic solvent. Suitable solvents for this purpose include hydrocarbons, such as benzene and toluene and the like. Temperature and pressure are not critical to this process aspect and one preferably works at temperatures between about 0° and the reflux temperature of the reaction mixture, and, for reasons of convenience, at normal pressure. In addition, the reaction can be performed in the presence of a catalyst such as sodium.

A compound of formula VIIIf or VIIIf' obtained as described above is then reduced to yield the desired compounds of formula VIII. The reduction of compounds of formula VIIIf or VIIIf' can, for example, be effected using zinc and glacial acetic acid or zinc and ammonium chloride. Here again, the reaction is expediently carried out in the presence of an inert organic solvent. Suitable solvents for this purpose include hydrocarbons, such as benzene and toluene; chlorinated hydrocarbons, such as methylene chloride; ethers, such as dioxane; alcohols, such as methanol, ethanol and the like. The reaction is expediently effected using temperatures between about 0° C and the reflux temperature of the reaction mixture. It is assumed that this reaction proceeds by way of the formation of a hydroxylamine intermediate product.

G. In a further process aspect of the present invention, a compound of the general formula

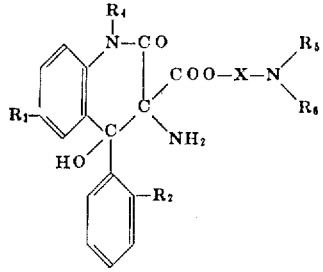

IX wherein X, $R_1$, $R_2$, $R_4$, $R_5$ and $R_6$ are as described above is converted into a compound of formula Ia by the acid or thermal treatment thereof.

The acid treatment of a compound of formula IX to obtain the corresponding compound of formula Ia is expediently carried out in the presence of an inert organic solvent. Suitable solvents for this purpose include hydrocarbons, such as benzene, toluene and the like; or chlorinated hydrocarbons, such as chloroform, carbon tetrachloride and the like.

For the purposes of this reaction, temperature and pressure are not critical and one expediently works at temperatures between room temperature and the reflux temperature of the reaction mixture, although temperatures below room temperature can likewise be employed. Suitable acids for the purpose of this process aspect include organic and inorganic acids, for example alkane-carboxylic acids, such as formic acid, acetic acid, propionic acid and the like; aromatic acids, such as benzoic acid; hydrohalic acids, such as hydrochloric acid, hydrobromic acid, phosphoric acid and the like.

Compounds of formula IX can also be converted to the desired compounds of formula Ia by heating said compounds in the presence or absence of an inert organic solvent. When the thermal treatment takes place in the presence of an inert organic solvent, temperatures within the range of from about 40° to about reflux temperature of the reaction mixture are employed. When the thermal treatment takes place in the absence of an inert organic solvent, the compounds of formula IX are expediently heated to temperatures between about 100° C to about 200° C. The same inert organic solvents used in the acid treatment of the compounds of formula IX can also be used in the thermal treatment of the compounds of formula IX to prepare the compounds of formula Ia. For either the acid or thermal treatment, compounds of formula IX in the form of their acid addition salts can also be employed.

The compounds of formula IX can be prepared by reacting a 2-aminobenzophenone of the general formula

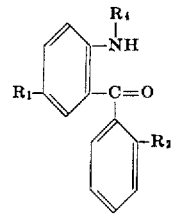

IXa wherein $R_1$, $R_2$ and $R_4$ are as described above with a compound of the general formula

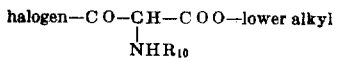

IXb wherein $R_{10}$ is any suitable protecting group, preferably a carbobenzoxy group or a trityl group to yield a compound of the formula

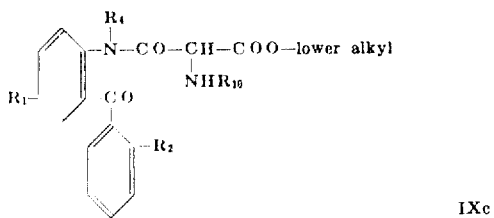

IXc wherein $R_1$, $R_2$, $R_4$ and $R_{10}$ are as described above.

The reaction conditions described for process aspect A above are applicable to the reaction. The resulting compound of formula IXc is subsequently reacted with a hydrohalic acid, such as hydrobromic acid and glacial acetic acid to yield a compound of the formula

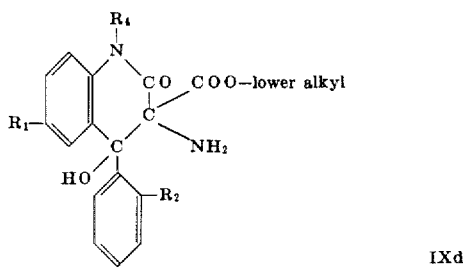

IXd wherein $R_1$, $R_2$ and $R_4$ are as described above.

If desired, a lower alkyl group, a lower alkoxy-lower alkyl group, a hydroxy-lower alkyl group or a dilower alkylamino-lower alkyl can be introduced into the 1-position of an unsubstituted compound of formula IXd following procedures described hereinbefore.

The compound of formula IXd so obtained is then reacted with a compound of formula III above following the reaction procedure disclosed for process aspect A above to yield the desired compounds of formula IX.

Alternately, compounds of formula IX can be prepared by treating a compound of formula IXc above with a base, i.e. triethylamine or pyridine to yield a compound of the formula

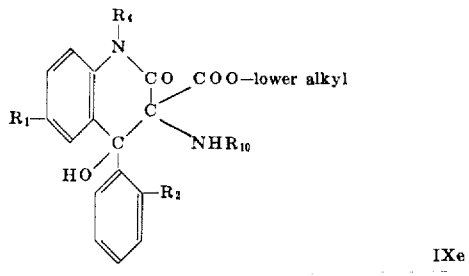

IXe wherein $R_1$, $R_2$, $R_4$ and $R_{10}$ are as described above.

The so obtained compound of formula IXe is then treated with a hydrohalic acid following the reaction procedure disclosed hereinabove to obtain a compound of formula IXd. The formula IXd compound is then reacted with a compound of formula III as described above to yield the desired compounds of formula IX.

It is to be pointed out that the respective starting materials of formula II, IV, V, VI, VII, VIII and IX do not necessarily have to be employed in an isolated state but can also be further reacted without isolation from the reaction mixture in which they have been manufactured. This is particularly true for the cyclization of the compounds of formula IV and VIII, as well as for the reaction between a compound of formula II wherein $R_6$ is lower alkoxy carbonyl and a compound of formula III.

Compounds of formulas Ia and Ib above form acid addition salts with organic and inorganic acids such as hydrochloric acid, hydrobromic acid, nitric acid, sulfuric acid, tartaric acid, citric acid, maleic acid, ascorbic acid and the like. Further, the compounds of formula I can be converted into quaternary salts with conventional quaternizing agents, for example, alkyl halides, such as methyliodide, ethyl bromide and the like.

Compounds of formulas Ia and Ib above as well as their pharmaceutically acceptable salts are useful as anticonvulsants, muscle relaxants, and sedatives. Their useful anticonvulsant activity is demonstrated in warm-blooded animals utilizing the standard pentamethylenetetrazole test. In this test, following the method of Orloff (Proc. Soc. Exptl. Biol. Med., 70, 254–257, 1949), 3-diethylaminopropyl 7-chloro-2,3-dihydro-2-oxo-5-(2-chlorophenyl)-1H-1,4-benzodiazepine-3-carboxylate hydrochloride, administered orally to mice possesses an $LD_{50}$ of 1,500 (p.o.) and displays an $APR_{2.0}$ of 0.7 mg/kg (p.o.) [by $APR_{2.0}$ is meant that dose in mg/kg of an anticonvulsant which brings about double the pentamethylenetetrazole consumption compared with the untreated control group]. Following the same procedure, 2-(morpholino) ethyl 2,3-dihydro-7-chloro-5-phenyl-2-oxo-1H-1,4-benzodiazepine-3-carboxylate hydrochloride displays an $APR_{2.0}$ of 2.0 mg/kg ($LD_{50}$ 1,875 mg/kg p.o.) and 3-(morpholino)propyl 7-nitro-5-(o-chlorophenyl)-2,3-dihydro-2-oxo-1H-1,4 -benzodiazepine-3-carboxylate hydrochloride displays an $APR_{2.0}$ of 0.4 mg/kg ($LD_{50}$ 2,100 mg/kg p.o.). In contrast thereto, phenobarbital, a commonly used anticonvulsant, shows an $APR_{2.0}$ of 30 mg/kg. The muscle relaxant activity is demonstrated in warm blooded animals utilizing the standard rotating rod test. For example, the above-mentioned 3-diethylaminopropyl 7-chloro-2,3-dihydro-2-oxo-5-(2-chlorophenyl)-1H-1,4-benzodiazepine-3-carboxylate hydrochloride shows an $HD_{50}$ of 30 mg/kg; 2-(morpholino)ethyl 2,3-dihydro-7-chloro-5-phenyl-2-oxo-1H-1,4-benzodiazepine-3-carboxylate hydrochloride shows an $HD_{50}$ of 7.0 mg/kg; and 3-(morpholino)propyl 7-nitro-5-(o-chlorophenyl)-2,3-dihydro-2-oxo-1H-1,4-benzodiazepine-3-carboxylate hydrochloride shows an $HD_{50}$ of 0.7 mg/kg.

Compounds of formulas Ia and Ib as well as their pharmaceutically acceptable salts, can accordingly be used as medicaments; for example, in the form of pharmaceutical preparations which contain them or their salts in admixture with a pharmaceutical, organic or inorganic inert carrier material which is suitable for enteral or parenteral application such as, for example, water, gelatin, lactose, starches, magnesium stearate, talc vegetable oils, gum arab., polyalkyleneglycols, Vaseline etc. The pharmaceutical preparations can be submitted in solid form (e.g. as tablets, dragees, suppositories, capsules), or in liquid form (e.g. as solutions, suspensions or emulsions). They may be sterilized and/or contain additives such as preserving, stabilizing, wetting or emulsifying agents, salts for varying the osmotic pressure or buffers. They can also contain yet other therapeutically valuable substances. The dosage is effected according to individual requirements, but a dosage of 0.05 mg/kg to 1 mg/kg/day is preferred.

The following examples illustrate the process in accordance with the invention. All temperatures are stated in °C.

EXAMPLE 1

10 g of ethyl 5-(o-chlorophenyl)-7-chloro-2,3-dihydro-2-oxo-1H-1,4-benzodiazepine-3-carboxylate, 100 ml of 3-diethylamino-1-propanol and 500 mg of sodium (cut small) are stirred for 4–5 hours at 30°–70° in a nitrogen stream, treated with 1 ml of acetic acid and 3-diethylamino-1-propanol is distilled off on the rotary evaporator (high vacuum, 0.1–0.5 mmHg). The residue is dissolved in benzene and extracted three times with water. The benzene phase is dried over magnesium sulphate and evaporated, the residue dissolved in methylene chloride, adjusted to pH 4–5 with ethereal hydrochloric acid, evaporated, the residue dissolved in water and extracted twice with benzene. The water phase is made alkaline and extracted with methylene chloride. The methylene chloride phase is dried, adjusted to pH = 3–5 with ethereal hydrochloric acid and crystallized from methylene chloride-acetic ester to yield 3-(diethylamino)propyl 7-chloro -5-(o-chlorophenyl)--dihydro-2-oxo-1H-1,4-benzodiazepine-3-carboxylate hydrochloride, m.p. 193°–198° (dec.).

EXAMPLE 2

Following the procedure set forth in Example 1 the following compounds can be prepared:

2-(Dimethylamino)-ethyl 7-chloro-2,3-dihydro-2-oxo-5-phenyl-1H-1,4-benzodiazepine-3-carboxylate hydrochloride, m.p. 206°–208° (dec.) from methylene chloride.

The corresponding dihydrochloride of m.p. 198°–200° is obtained when the methylene chloride phase is brought to pH 1–2 with ethereal hydrochloric acid, the methylene chloride evaporated off and the residue crystallized from acetone.

The free base of m.p. 62° (dec.) is obtained by making alkaline and crystallization from petroleum ether/methylene chloride.

2-Morpholinoethyl 7-chloro-2,3-dihydro-2-oxo-5-phenyl-1H-1,4-benzodiazepine-3-carboxylate hydrochloride, m.p. 174°–178° (dec.) from acetone.

The free base melts at 100°–109° (dec.) from cyclohexane.

3-(Diethylamino)propyl 7-chloro-2,3-dihydro-2-oxo-5-phenyl-1H-1,4-benzodiazepine-3-carboxylate hydrochloride, m.p. 204°–206° (dec.) from methylene chloride/acetone.

The free base melts at 149°–150° (dec.) from cyclohexane.

2-(1-Piperazinyl)ethyl 7-chloro-2,3-dihydro-2-oxo-phenyl-1H-1,4-benzodiazepine-3-carboxylate dihydrochloride, m.p. 216°–217° (dec.) from acetone/water.

2-Piperidinoethyl 7-chloro-2,3-dihydro-2-oxo-5-phenyl-1H-1,4-benzodiazepine-3-carboxylate dihydrochloride, m.p. 172°–173° (dec.) from methylene chloride/acetone.

The free base melts at 152°–153° (dec.) from methylene chloride/acetone.

3-(Diethylamino)propyl 7-chloro-2,3-dihydro-1-methyl-2-oxo-5-phenyl-1H-1,4-benzodiazepine-3-carboxylate hydrochloride, m.p. 204°–206° (dec.) from methylene chloride/acetone.

3-(Diethylamino)propyl 7-chloro-2,3-dihydro-3-hydroxy-1-methyl-2-oxo-1H-1,4-benzodiazepine-3-carboxylate hydrochloride, m.p. 195°–196° (dec.) from methylene chloride/acetic ester.

2-(Dimethylamino)-2-methylpropyl 7-chloro-2,3-dihydro-2-oxo-5-phenyl-1H-1,4-benzodiazepine-3-carboxylate hydrochloride, m.p. 176°–178° from methylene chloride/acetic ester.

3-(Diethylamino)propyl 7-chloro-2,3-dihydro-1-(methoxymethyl)-2-oxo-5-phenyl-1H-1,4-benzodiazepine-3-carboxylate hydrochloride, m.p. 103°–105° (dec.) from methylene chloride/acetone.

2-[(4-Methyl)-1-piperazinyl]ethyl 7-chloro-2,3-dihydro-2-oxo-5-phenyl-1H-1,4-benzodiazepine-3-carboxylate dihydrochloride of m.p. 204°–206° (dec.) from methylene chloride/acetic ester/methanol.

3-(Diethylamino)propyl 2,3-dihydro-7-nitro-2-oxo-5-phenyl-1H-1,4-benzodiazepine-3-carboxylate hydrochloride of m.p. 165° (dec.) from methylene chloride/acetone. 3-Morpholinopropyl 7-chloro-2,3-dihydro-2-oxo-5-phenyl-1H-1,4-benzodiazepine-3-carboxylate hydrochloride of m.p. 170°–172° (dec.) from methylene chloride/acetone.

6-Morpholinohexyl 7-chloro-2,3-dihydro-2-oxo-5-phenyl-1H-1,4-benzodiazepine-3-carboxylate of m.p. 147°–150° from acetic ester/petroleum ether. The monohydrochloride crystallizes from methylene chloride/acetic ester/methanol, m.p. 210°–212° (dec.).

4-Morpholinobutyl 7-chloro-2,3-dihydro-2-oxo-5-phenyl-1H-1,4-benzodiazepine-3-carboxylate of m.p. 128°–130° (dec.) from acetic ester. The monohydrochloride crystallizes from methylene chloride/acetic ester/methanol, m.p. 160°–165° (dec.).

2-Diethylamino-1-methylethyl 7-chloro-2,3-dihydro-2-oxo-5-phenyl-1H-1,4-benzodiazepine-3-carboxylate hydrochloride of m.p. 225° (dec.) from methylene chloride/acetone.

3-Morpholinopropyl 7-chloro-2,3-dihydro-1-(methoxymethyl)-2-oxo-5-phenyl-1H-1,4-benzodiazepine-3-carboxylate hydrochloride of m.p. 190° (dec.) from acetone/ether.

EXAMPLE 3

1 g of ethyl 5-(o-chlorophenyl)-2,3-dihydro-7-nitro-2-oxo-1H-1,4-benzodiazepine-3-carboxylate, 10 ml of 3-morpholino-1-propanol and 100 mg of sodium (cut small) are stirred at room temperature in a nitrogen stream. After about an hour, 50 mg of sodium (cut) are once more added thereto and the reaction mixture further stirred. After 2–3 hours, the reaction mixture is diluted with methylene chloride, the sodium filtered off and washed with methylene chloride. The methylene chloride phase is adjusted to pH 6–7 with acetic acid and extracted with an aqueous sodium bicarbonate solution (10 percent). After 2–3 extractions, the methylene chloride phase is dried and evaporated in vacuum. The residue is dissolved in 30 ml of benzene and extracted three times with 70 ml of water. The benzene phase is then adjusted to pH 2–3 with ethereal hydrochloric acid. The precipitated product is dissolved in 40 ml of water and shaken with the benzene phase. The separation of the water and benzene phase is facilitated by addition of 5–10 ml of saturated sodium chloride solution. After the separation, the water phase is extracted with methylene chloride, dried, evaporated in vacuum and crystallized from benzene to yield 3-morpholinopropyl 2,3-dihydro-7-nitro-5-(o-chlorophenyl)-2-oxo-1H-1,4-benzodiazepine-3-carboxylate, m.p. 203°–204° (dec.).

After drying and vacuum distillation, the benzene phase gives 0.5 g of oil.

1.9 g of free base is dissolved in methylene chloride and adjusted to pH 2–3 with acetone/hydrochloric acid. After filtration, there are obtained 1.6 g of monohydrochloride of m.p. 188°–190° (dec.).

EXAMPLE 4

0.8 g of a 50 percent suspension of sodiumhydride in mineral oil were added to a solution of 3.42 g ethyl 7-chloro-1,3-dihydro-5-phenyl-2H-1,4-benzodiazepin-2-one-3-carboxylate in 30 ml of dimethylformamide cooled to −10°. After having stirred for 30 minutes at −10° the temperature was lowered to −40°. 1.3 ml of chlorodimethylether were added and the temperature was allowed to reach −10° within 30 minutes. The reaction mixture was poured on 100 ml of water and 10 ml of 2 N acetic acid. The precipitated product was collected and dissolved in methylene chloride. The solution was dried over sodium sulfate and evaporated. The residue was crystallized from methylene chloride/ether. Recrystallization from the same solvents yielded ethyl 7-chloro-1,3-dihydro-1-(methoxy methyl)-5-phenyl-2H-1,4-benzodiazepin-2-one-3-carboxylate with m.p. 161°–164°.

In analogy to the procedures disclosed in Example 1, 3-morpholinopropyl 7-chloro-2,3-dihydro-1-(methoxymethyl)-2-oxo-5-phenyl-1H-1,4-benzodiazepine-3-carboxylate hydrochloride, m.p. 190° C (dec.) from acetone/ether can be prepared from ethyl 7-chloro-1,3-dihydro-1-(methoxymethyl)-5-phenyl-2H-1,4-benzodiazepin-2-one-3-carboxylate.

EXAMPLE 5

7 g of methyl 7-chloro-2,3-dihydro-2-oxo-5-phenyl-1H-1,4-benzodiazepine-3-carboxylate-4-oxide are stirred with 80 ml of 2-dimethylaminoethanol in a nitrogen stream at room temperature for 24 hours. The 2-dimethylaminoethanol is evaporated off in high vacuum, the residue twice dissolved in methylene chloride and evaporated off. The residue is dissolved in methylene chloride and treated with ethereal hydrochloric acid. The methylene chloride is evaporated off and the residue crystallized from acetone/ethyl acetate to yield 2-(dimethylamino)ethyl 7-chloro-2,3-dihydro-2-oxo-5-phenyl-1H-1,4-benzodiazepine-3-carboxylate 4-oxide hydrochloride, m.p. 155° (dec.).

EXAMPLE 6

8.5 g of ethyl 7-chloro-2,3-dihydro-2-oxo-5-phenyl-1H-1,4-benzodiazepine-3-carboxylate are dissolved in 450 ml of toluene and treated with 18 g of piperidino-2-propanol. 20 ml of toluene are distilled off, the mixture cooled to 10° and treated with 500 mg of sodium. After all the sodium has reacted, 50 ml of toluene are distilled off via a Vigreux column and the reaction mixture heated to reflux for a further 2 hours. After cooling, the mixture is treated with 500 ml of methylene chloride and extracted three times with water. After drying, the methylene chloride/toluene phase is evaporated. The residue is treated with petroleum ether and dried in high vacuum. The solid product is dissolved in acetone and adjusted to pH 5–7 with acetone/hydrochloric acid, treated with acetic ester and crystallized at 4° to yield 1-methyl-2-piperidinoethyl 7-chloro-2,3-dihydro-2-oxo-5-phenyl-1H-1,4-benzodiazepine-3-carboxylate hydrochloride, m.p. 190° (dec.).

EXAMPLE 7

3 g of 3-(diethylamino)propyl 7-chloro-2,3-dihydro-2-oxo-5-phenyl-1H-1,4-benzodiazepine-3-carboxylate (m.p. 149°–150° [dec.]) are dissolved in 30 ml of absolute benzene with slight heating. At the same time, a solution of 1.4 g of methyl bromide in 30 ml of benzene is prepared. The two solutions are mixed and stirred at room temperature. After about 1–2 hours, [3-{[(7-chloro-2,3-dihydro-2-oxo-5-phenyl-1H-1,4-benzodiazepin-3yl)carbonyl]oxy}propyl] diethylammonium bromide precipitates. After 4 hours, the quaternary salt is filtered off by suction, washed with benzene and ether and recrystallized from methylene chloride/acetic ester. The product melts at 170°–174° (dec.).

EXAMPLE 8

The following compounds can be manufactured according to the procedure described in Example 7.

4-[3-{[(7-chloro-2,3-dihydro-1-(methoxymethyl)-2-oxo-5-phenyl-1H-1,4-benzodiazepin-3-yl)carbonyl]oxy}propyl]-4-methylmorpholinium bromide of m.p. 168° (dec.) from benzene/ether.

4-[3-{[(7-Nitro-2,3-dihydro-2-oxo-5-(o-chlorophenyl)-1H-1,4-benzodiazepin-3-yl)carbonyl]oxy}propyl]-4-methyl-morpholinium bromide, m.p. 140°–150° (dec.) from benzene/acetone.

[2-{[(7-Chloro-2,3-dihydro-2-oxo-5-phenyl-1H-1,4-benzodiazepin-3-yl)carbonyl]oxy}ethyl]-triethylammonium bromide of m.p. 194°–196° (dec.) from methylene chloride/acetic ester.

{3-[(7-Chloro-2,3-dihydro-2-oxo-5-phenyl-1H-1,4-benzodiazepin-3-yl)carbonyl]oxy]propyl}-triethylammonium bromide of m.p. 155°–160° from benzene.

EXAMPLE 9

A solution of 7.5 g of 2-amino-5-chlorobenzophenone β-oxime (m.p. 129°–132°) in 50 ml of methylene chloride is overlaid with 50 ml of saturated sodium bicarbonate solution. With strong stirring, a solution of 22 g of crude 2-{2-[N-(benzyloxy)carbonyl-N-methylamino]ethoxy}carbonyl-2-bromo-acetyl chloride in 25 ml of methylene chloride is added dropwise at 0°–5°. After the addition, [the mixture] is further stirred for 30 minutes without cooling. The organic phase is separated off, dried over sodium sulphate and evaporated, finally with the addition of absolute benzene. The residue is dissolved in 50 ml of absolute benzene and treated with 5 ml of triethylamine. After standing at room temperature overnight, it is evaporated in vacuum and the residue partitioned between 1-N acetic acid and methylene chloride. The methylene chloride phase is washed with water and bicarbonate solution, dried and evaporated. Chromatography of the crude product (20 g) on 300 g of silica gel with benzene/ethyl acetate permits the isolation of 2-[N-(benzyloxy)-carbonyl-N-methylamino]ethyl 7-chloro-2,3-dihydro-2-oxo-5-phenyl-1H-1,4-benzodiazepine-3-carboxylate 4-oxide which, recrystallized from methylene chloride/hexane, melts at 161°–162°.

20 ml of a 30 percent solution of hydrogen bromide in glacial acetic are added to a solution of 4.5 g of 2-[N-(benzyloxy)carbonyl-N-methylamino]thyl 7-chloro-2,3-dihydro-2-oxo-5-phenyl-1H-1,4-benzodiazepine-3-carboxylate 4-oxide. After 2 hours standing at room temperature, the solution is concentrated in vacuum at 30°–40°. Crystallization of the residue from alcohol/acetone yields 2-(methylamino)ethyl 7-chloro-2,3-dihydro-2-oxo-5-phenyl-1H-1,4-benzodiazepine-3-carboxylate 4-oxide hydrobromide which melts at 195°–200° with decomposition.

The 2-{2-[N-(benzyloxy)carbonyl-N-methylamino]-ethoxy}carbonyl-2-bromo-acetyl chloride can be manufactured as follows:

181 g of N-(benzyloxy)carbonyl-methylamino-ethanol are added dropwise at 0° to a solution of 55.6 g of malonyl chloride. After 15 minutes, 63 g of pyridine are added dropwise at 0°. After the addition, [the mixture] is further stirred without cooling for 2 hours. The solution is washed twice with 200 ml of 2-N hydrochloric acid, twice with 200 ml of bicarbonate solution, dried over sodium sulphate and evaporated in vacuum, finally after addition of benzene. 167 g of di-{2-[N-(benzyloxy)carbonyl-N-methylamino]ethyl} malonate are obtained as a yellow oil which is directly further processed.

160 g of crude di-{2-[N-(benzyloxy)carbonyl-N-methylamino]ethyl} malonate are added to a mixture of 16.5 g of potassium hydroxide, 15 ml of water and 400 ml of t-butanol. This is thereupon stirred at room temperature for 18 hours. The precipitated salt is filtered off by suction and taken up in water. The aqueous solution is washed out with ether and acidified with 2-N-hydrochloric acid and extracted with methylene chloride. After evaporation, the dried extracts yield 26 g of malonic acid mono-[2-N-benzyloxy)carbonyl-N-methylamino]ethyl ester as a yellow oil.

25 g of this malonic acid half-ester are boiled under reflux for 1 hour in 150 ml of chloroform in the presence of 15 g of N-bromo-succinimide. After evaporation in vacuum, the residue is suspended in ether, the succinimide separated off by filtration and the filtrate evaporated in vacuum. The bromomalonic acid mono-[2-N-(benzyloxy)carbonyl-N-methylamino]ethyl ester obtained (32 g) is dissolved in 100 ml of methylene chloride and treated with 14 g of oxalyl chloride. After standing at room temperature for 2 days, [the mixture] is evaporated in vacuum, finally after addition of absolute benzene. The residual crude bromomalonic acid chloride 2-[N-(benzyloxy)-carbonyl-N-methylamino]ethyl ester (31 g) is directly employed for the acylation.

EXAMPLE 10

428 mg (1 mmol) of 3-(diethylamino)propyl 7-chloro-2,3-dihydro-2-oxo-5-phenyl-1H-1,4-benzodiazepine-3-carboxylate is dissolved in 300 ml of abs. benzene, 50 mg of sodium hydride (in oil, 50 percent) added and stirred at room temperature for ca 2 hours. 126 mg of dimethyl sulphate in 10 ml of abs. benzene are then added and stirred overnight at room temperature, poured into ice-water, extracted with benzene, dried and evaporated to yield 3-(diethylamino)propyl 7-chloro-2,3-dihydro-1-methyl-2-oxo-5-phenyl-1H-1,4-benzodiazepine-3-carboxylate.

EXAMPLE 11

856 mg of 3-(diethylamino)propyl 7-chloro-2,3-dihydro-2-oxo-5-phenyl-1H-1,4-benzodiazepine-3-carboxylate are dissolved in 30 ml of abs. benzene, 100 mg of sodium hydride (in oil, 50 percent) are added and stirred at room temperature for 3–4 hours. 272 mg of diethylaminoethyl chloride in 10 ml of abs. benzene are then added and once more stirred at room temperature for 2–3 hours, poured into ice-water, extracted with benzene, dried and evaporated to yield 3-(diethylamino)-propyl 7-chloro-1-[(diethylamino)-ethyl]-2,3-dihydro-2-oxo-5-phenyl-1H-1,4-benzodiazepine-3-carboxylate.

EXAMPLE 12

A solution of 23 g of 2-amino-5-chlorobenzophenone in 200 ml of methylene chloride is overlaid with 100 ml of saturated sodium bicarbonate solution. At 0°–5°, 19.3 g. of 2-carbethoxyacetyl chloride are added dropwise with vigorous stirring. After completed addition, the mixture is allowed to further stir for 10 minutes. The methylene chloride phase is separated off, washed with bicarbonate solution, dried over sodium sulphate and evaporated. The residue is crystallized from ether-hexane by cooling to −10°. After filtering off by suction and drying in vacuum, there is obtained colorless ethyl 2′-benzoyl-4′-chloromalonanilate of melting point 54°–55° C.

A solution of 50 g of sodium nitrite is added dropwise to a solution of 34.6 g of ethyl 2′-benzoyl-4′-chloromalonanilate in 250 ml of glacial acetic. After 1½ hours stirring at room temperature, the oxime crystallized out is filtered off by suction, washed with water and dried in vacuum. Ethyl 2′-benzoyl-4′-chloromesoxalanilate 2-oxime of melting point 98°–105° is obtained.

Water is added dropwise with stirring to the filtrate, whereby further oxime crystallizes out.

According to the thin layer chromatogram, the crude product mixture consists of a mixture of the two stereoisomeric oximes. These may be separated by chromatography on silica gel with 20 percent acetic ester in methylene chloride. The firstly eluted isomer melts at 115°–117° after crystallization from alcohol-water. The oxime eluted layer displays a melting point of 131°–132° after crystallization from ether-hexane.

A solution of 15 g of ethyl 2′-benzoyl-4′-chloro-mesoxalanilate 2-oxime in 150 ml of absolute benzene and 60 ml of dimehylaminoethanol is treated with 0.6 g of a 50 percent sodium hydride suspension in mineral oil and allowed to stand at room temperature for 16 hours. The benzene is evaporated off in vacuum and replaced by fresh benzene. After a further 24 hours standing at room temperature, the mixture is concentrated in vacuum, and evaporated to dryness in high vacuum, finally with the addition of xylene. The residue is partitioned between 2-N hydrochloric acid and ether. The ether phase is extracted with dilute hydrochloric acid. The extracts are washed with ether and, after the addition of ice, made alkaline with 10 percent soda solution.

The flocculated material is filtered off by suction, washed with ice-water and dried in vacuum. 2-Dimethylaminoethyl 2′-benzoyl-4′-chloromesoxalanilate 2-oxime is obtained in the form of a yellow powder which is directly further processed.

4.5 g of zinc dust are added to a solution of 5 g of crude 2-dimethylaminoethyl 2′-benzoyl-4′-chloromesoxalanilate 2-oxime in 100 ml of methylene chloride. 10 ml of glacial acetic are added dropwise with stirring. After the addition, [the mixture] is stirred for 30 minutes, thereupon filtered and evaporated in vacuum. The residue is taken up in 100 ml of benzene and 5 ml of glacial acetic.

The mixture is boiled for 30 minutes with distillation of benzene. After cooling, it is partitioned between water and benzene, the aqueous phase washed with benzene and, after the addition of ice, made alkaline with 10 percent soda solution. The base separated out is extracted with methylene chloride.

The methylene chloride extracts are washed with ice-water, dried over sodium sulphate and evaporated. There remains 2-dimethylaminoethyl 7-chloro-1,3-dihydro-5-phenyl-2H-1,4-benzodiazepin-2-one-3-carboxylate, the hydrochloride of which, crystallized from methylene chloride-acetone, melts at 206°–208° with dec.

EXAMPLE 13

5 g Ethyl 7-chloro-1-[2(diethylamino)ethyl]-2,3-dihydro-2-oxo-5-phenyl-1H-1,4-benzodiazepine-3-carboxylate are dissolved in 40 ml of diethylaminopropanol. 250 mg Sodium are added and the mixture is stirred for 2 hours at room temperature. After addition of 0.5 ml glacial acetic acid the diethylaminopropanol is evaporated under reduced pressure. The residue is distributed between water and benzene. The benzene layer is washed with water, dried over magnesiumsulfate, filtered and evaporated. The residue is dissolved in methylene chloride and acidified to pH 4 by addition of hydrogenchloride in methylene chloride. The solution is extracted with water. The water phase is washed with benzene and made alkaline by addition of sodiumcarbonate. The precipitated base is extracted with benzene. The extracts are dried, filtered and evaporated. Crystallization of the residue from petroleum ether yields 2-diethylaminopropyl 7-chloro-1-[2-(diethylamino)ethyl]-2,3-dihydro-2-oxo-5-phenyl-1H-1,4-benzodiazepine-3-carboxylate. The dihydrochloride of which melts at 200°–204°. The starting material may be prepared as follows:

10 g Ethyl 7-chloro-2,3-dihydro-2-oxo-5-phenyl-1H-1,4-benzodiazepine-3-carboxylate are dissolved in 25 ml of dimethylformamide and a solution of 0.8 g of sodium in 15 ml ethanol is added at room temperature. After having stirred for 1 ½ hour 9 g diethylaminoethylchloride are added dropwise to the reaction mixture. Stirring is continued for an additional 2 hours. The mixture is poured into ice-water and extracted with benzene. The benzene layer is washed four times with water, dried over magnesiumsulfate, filtered and evaporated. Crystallization of the residue from ether/petroleum ether yielded ethyl 7-chloro-1-[2-(diethylamino)ethyl]-2,3-dihydro-2-oxo-5-phenyl-1H-1,4-benzodiazepine-3-carboxylate with m.p. 75°–85° dec. Recrystallization from ethanol raises the m.p. to 92°–95°.

Analogously 3-morpholinopropyl 7-chloro-2,3-dihydro-5-(o-fluorophenyl)-2-oxo-1H-1,4-benzodiazepine-3-carboxylate may be prepared which crystallizes from ether with m.p. 170° dec.

EXAMPLE 14

Following the procedure described in example 10 ethyl 7-chloro-2,3-dihydro-1-(2-hydroxyethyl)-2-oxo-5-phenyl-1H-1,4-benzodiazepine-3-carboxylate can be obtained which is purified by chromatography or silica gel using 20 percent ethylacetic in methylene chloride. Recrystallized from ethanol, it melts at 168°–170°. This compound is converted as described in example 10 to 3-(diethylamino)propyl 7-chloro-2,3-dihydro-1-(2-hydroxyethyl)-2-oxo-5-phenyl-1H-1,4-benzodiazepine-3-carboxylate which crystallizes from ether/petroleum ether and melts at 118°–120°.

EXAMPLE 15

0.25 g Sodiumhydride (50 percent in mineral oil) are washed with petroleum ether and added to a solution of 2.5 g 3-morpholinopropyl 5-(o-chlorophenyl)-2,3-dihydro-7-nitro-2-oxo-1H-1,4-benzodiazepine-3-carboxylate in 20 ml of dimethylformamide cooled to −20°. The reaction mixture is stirred for 5 minutes and cooled further to −40°. 0.7 g Dimethylsulfate are added and the mixture is stored in the refrigerator overnight. After addition of 0.5 ml glacial acetic acid the solvent is removed under high vacuum. The residue is crystallized from ether. Recrystallization from methylene chloride/ethylacetate yields 3-morpholinopropyl 5-(o-chlorophenyl)-2,3-dihydro-1-methyl-7-nitro-2-oxo-1H-1,4-benzodiazepine-3-carboxylate with m.p. 160°–162°. The monohydrochloride crystallizes from ether and melts at 172°–175° dec.

Analogously 3-morpholinopropyl 5-(o-chlorophenyl)-2,3-dihydro-1-(methoxymethyl)-7-nitro-2-oxo-1H-1,4-benzodiazepine-3-carboxylate is prepared. Cyrstallized from ether/ethylacetate it melts at 128°–130°. The monohydridechloride crystallizes from ether/methylene chloride with m.p. 153° dec.

EXAMPLE 16

A mixture of 2.5 g 3-(diethylamino)propyl 7-chloro-2,3-dihydro-2-oxo-5-phenyl-1H-1,4-benzodiazepine-3-carboxylate 4-oxide hydrochloride, 30 ml methylenechloride and 0.7 g phosphorous trichloride is stirred for 24 hours. The reaction mixture is distributed between benzene and sodiumcarbonate solution. The benzene layer is washed, dried over magnesiumsulfate, filtered and evaporated. The residue is dissolved in methylenechloride. The solution is acidified with hydrogenchloride for pH 2–3 and evaporated. The residue is distributed between benzene and water. The water phase is washed twice with benzene, made alcaline with sodium carbonate and extracted with methylene chloride. The organic phase is dried over magnesium sulfate, filtered and evaporated. The 3-(diethylamino)propyl 7-chloro-2,3-dihydro-2-oxo-5-phenyl-1H-1,4-benzodiazepine-3-carboxylate is conversed to the monohydrochloride which crystallizes from methylene chloride/ethyl-acetate and melts at 198°–199° dec.

EXAMPLE 17

14 g of Sodium methoxide are added to 145 g of morpholinopropanol. 14–20 ml of morpholinopropanol are then distilled off under vacuum to remove the methanol from the reaction mixture. After dilution with 33 ml of methylene chloride, 39.6 g of ethyl 5-(o-chlorophenyl)-2,3-dihydro-7-nitro-2-oxo-1H-1,4-benzodiazepine-3-carboxylate are added. The mixture is stirred at room temperature for 15 minutes and at 30° for 30 minutes under reduced pressure to remove the ethanol liberated. The reaction mixture is diluted with 200 ml of methylene chloride and adjusted to pH 7–8 by addition of 8 ml of glacial acetic acid. The methylene chloride solution is washed with saturated sodium bicarbonate solution and five times with 200 ml portions of water. The residue obtained by evaporation of the dried methylene chloride phase is crystallized from 200 ml of benzene to yield 3-morpholinopropyl 2,3-dihydro-5-(o-chlorophenyl)-7-nitro-2-oxo-1H-1,4-benzodiazepine-3-carboxylate with m.p. 198°–202°.

36 g of 3-Morpholinopropyl 2,3-dihydro-5-(o-chlorophenyl)-7-nitro-2-oxo-1H-1,4-benzodiazepin-3-carboxylate are dissolved in 150 ml of warm dimethylformamide. The filtered solution is cooled to 0° and adjusted to pH 2 by addition of hydrogenchloride in methylene chloride. The solvents are removed under reduced pressure at 45°–50°. The residue is crystallized from 200 ml of methylene chloride to yield 3-morpholinopropyl 2,3-dihydro-5-(o-chlorophenyl)-7-nitro-2-oxo-1H-1,4-benzodiazepine-3-carboxylate monohydrochloride with mp. 229°–232° dec.

Analogously the reaction of ethyl 7-chloro-2,3-dihydro-5-phenyl-2-oxo-1H-1,4-benzodiazepine-3-carboxylate 4-oxide with diethylaminopropanol produces 3-(diethylamino) propyl 7-chloro-2,3-dihydro-2-oxo-5-phenyl-1,4-benzodiazepine-3-carboxylate 4-oxide hydrochloride with mp. 183° dec.

EXAMPLE 18

A solution of 2.5 g potassiumhydroxide in 10 ml of ethanol is added to a solution of 5 g ethyl 2,3-dihydro-5-(o-chlorophenyl)-7-nitro-2,3-dihydro-2-oxo-1H-1,4-benzodiazepine-3-carboxylate in 20 ml of ethanol. The mixture is stirred at room temperature over night. The precipitated potassium salt of 2,3-dihydro-5-(o-chlorophenyl)-7-nitro-2-oxo-1H-1,4-benzodiazepine-3-carboxylic acid is collected, washed twice with ethanol and twice with methylene chloride. 2 g of this salt are suspended in 30 ml of chloroform, 2 ml of morpholinopropanol follow by 1 ml of methyl chloroformate are added with ice cooling. After 5 minutes the reaction mixture is buffered by addition of acetic acid and distributed between saturated sodiumbicarbonate solution and chloroform. The aqueous layer was washed with chloroform. The chloroform extracts are combined, dried, adjusted to pH 3–4 by addition of hydrogenchloride and evaporated. The residue is distributed between benzene and water. The water layer is made alkaline with sodiumbicarbonate and extracted with methylene chloride. The extracts are dried, filtered and evaporated. Crystallization of the residue from benzene yields 3-morpholinopropyl 2,3-dihydro-5-(o-chlorophenyl)-7-nitro-2-oxo-1H-1,4-benzodiazepine-3-carboxylate with mp. 203°–205°. The following compounds are prepared in analogous manner:

3-(Diethylamino)propyl-7-chloro-2,3-dihydro-2-oxo-5-phenyl-1H-1,4-benzodiazepine-3-carboxylate hydrochloride with mp. 210° dec.

2-(Diethylamino)-1-methylethyl 7-chloro-2,3-dihydro-2-oxo-5-phenyl-1H-1,4-benzodiazepine-3-carboxylate hydrochloride with mp. 237° dec.

3-Morpholinopropyl 7-Chloro-2,3-dihydro-2-oxo-5-phenyl-1H-1,4-benzodiazepine-3-carboxylate hydrochloride of m.p. 170°–172° dec.

EXAMPLE 19

To a solution of 1.1 g of 3-(diethylamino) propyl 7-chloro-2-oxo-5-phenyl-2,3,4,5-tetrahydro-1H-1,4-benzodiazepine-3-carboxylate in 10 ml of chloroform a solution of 0.19 ml bromine in 10 ml of chloroform is added dropwise with ice cooling. The mixture is stirred at room temperature for 15 minutes, cooled again with ice and shaked with 25 ml 2 N sodium hydroxide solution. The chloroform solution is buffered with a few drops of acetic acid, washed with water, dried over magnesium sulfate, filtered and evaporated. The 3-(diethylamino)propyl 7-chloro-2,3-dihydro-2-oxo-5-phenyl-1H-1,4-benzodiazepine-2-carboxylate obtained is converted to its hydrochloride.

The starting material is prepared as follows:

A mixture of 444 mg of 3-(diethylamino)propyl 7-chloro-2,3-dihydro-2-oxo-5-phenyl-1H-1,4-benzodiazepine-3-carboxylate 4-oxide hydrochloride, 50 mg of platinum oxide and 4 ml of glacial acetic acid is hydrogenated at room temperature and atmospheric pressure. 50 ml of hydrogen are consumed within 1 ½ hours. The catalyst was removed by filtration. 3-(Diethylamino)propyl 7-chloro-2-oxo-5-phenyl-2,3,4,5-tetrahydro-1H-1,4-benzodiazepine-3-carboxylate hydrochloride crystallizes from the filtrate after standing and melts at 170°–174° dec.

EXAMPLE 20

A mixture of 388 mg of ethyl 3-amino-6-chloro-4-(o-fluorophenyl)-4-hydroxy-2-oxo-1,2,3,4-tetrahydro-3-quinoline carboxylate, 600 mg of morpholinopropanol 600 mg of dimethylformamide and sodiumbromide is stirred at room temperature for 2 hours. The reaction mixture is buffered with acetic acid and poured into aqueous sodium carbonate solution and extracted with methylene chloride. The extracts are washed 3–4 times with water, dried over magnesium sulfate, filtered and adjusted to pH 2 by addition of hydrogenchloride. The acidified solution is evaporated and the residue distributed between benzene and water. The aqueous phase is washed twice with benzene made alkaline by addition of sodium carbonate and extracted with methylene chloride. The extracts are dried, filtered and evaporated. The residue is chromatographed on 8 g of silica gel with acetone to yield 3-morpholinopropyl 3-amino-6-chloro-4-(o-fluorophenyl)-4-hydroxy-2-oxo-1,2,3,4-tetrahydro-3-quinoline carboxylate.

A mixture of 75 mg of 3-morpholinopropyl 3-amino-6-chloro-4-(o-fluorophenyl)-4-hydroxy-2-oxo-1,2,3,4-tetrahydro-3-quinoline carboxylate, 1 ml of toluene and 1 ml of glacial acetic acid is heated to 40° for 3 hours. The reaction mixture is evaporated and the residue distributed between sodium bicarbonate solution and methylene chloride. The methylene chloride layer is dried over magnesium sulfate, filtered and evaporated. The residue is dissolved in benzene and the solution again evaporated.

3-morpholinopropyl 7-chloro-2,3-dihydro-5-(o-fluorophenyl-2-oxo-1H-1,4-benzoadiazepine-3-carboxylate is crystallized from ether and melts at 170°-172° dec.

The starting material is prepared as follows:

12.5 g phosphorous pentachloride are added to a suspension of 17 g 2-carbethoxy-N-benzyloxycarbonyl)-glycine in 150 ml methylene chloride at −20°. The mixture is stirred for about 20 min. at −20° whereupon a clear solution is obtained. A solution of 12.5 g of 5-chloro-2-amino-2'-fluorobenzophenone in 100 ml of methylene chloride is then added followed by 100 ml of 10 percent to aqueous sodium carbonate with vigorous stirring. The temperature is allowed to reach 20° within 2 ½ hours while the pH of the aqueous phase is kept between 7 and 8 by addition of solid sodium carbonate. After dilution with water and methyline chloride, the organic layer is separated, washed with water, dried and evaporated. The residue crystallizes from ethanol/ether and is crystallized from ethanol to yield ethyl 2-[1-(benzyloxy)formamido]-2'-(o-fluorophenyl)-4'-chloro-malonanilate with mp. 106°-107°.

A suspension of 5 g ethyl 2-[1-(benzyloxy) formamido-2'-(o-fluorophenyl)-4'-chloromalonanilate in 15 ml glacial acetic acid containing 30-33 percent hydrogen bromide is stirred at room temperature until complete solution results (1-2 hours). The reaction mixture is poured on 2 or sodium hydroxide and ice and extracted with methylene chloride. The extracts are dried, filtered, and evaporated. The residue is dissolved in ethanol and moved in the refrigerator whereupon ethyl 3-amino-6-chloro-4-(o-fluorophenyl)-4-hydroxy-1,2,3,4-tetrahydro-3-quinoline carboxylate with mp. 169°-170° dec. is obtained.

EXAMPLE 21

Tablets of the following compositions can be prepared as follows:

| | |
|---|---|
| 3-Diethylaminopropyl 7-chloro 2,3-dihydro-2-oxo-5-(2-chlorophenyl)-1H-1,4-benzodiazepine-3-carboxylate | 5.0 mg. |
| Corn starch | 40.0 mg. |
| Lactose | 75.0 mg. |
| Gelatine (as of 10% solution) | 3.0 mg. |
| Talc | 2.5 mg. |
| Magnesium stearate | 2.5 mg. |
| Corn starch | 7.0 mg. |
| | 135.0 mg. |

The active substance, the first part of the corn starch and the lactose are thickened with the gelatine. The paste is granulated and the granulate dried at 43°, comminuted to suitable fineness and mixed with the talc, magnesium stearate and the second part of the corn starch and pressed.

EXAMPLE 22

10 mg of 3-diethylaminopropyl 7-chloro-2,3-dihydro-2-oxo-5-(2-chlorophenyl)-1H-1,4-benzodiazepine-3-carboxylate and 5 ml of water for injection are filled into duplex ampoules, one ampoule containing the active substance and the other containing the water necessary for the solution. The ampoules are sealed and sterilized at 124° C. for 2 hours.

EXAMPLE 23

Suppositories of the following composition are manufactured:

| | |
|---|---|
| 3-Diethylaminopropyl 7-chloro-2,3-dihydro-2-oxo-5-(2-chlorophenyl)-1H-1,4-benzodiazepine-3-carboxylate | 1.8 g |
| Propylene glycol monostearate | 81.7 g |
| Beeswax | 1.5 g |
| Petrolatum | 8.0 g |
| Polysorbate 80 | 2.0 g |
| Polyoxyethylene stearate | 5.0 g |

The ingredients are melted in a suitable vessel fitted with glass liner (stainless steel can also be used), cooled to about 45° and mixed, with stirring, with the active substance. The mixture is then poured into suppository moulds which ensure a suppository weight of 1.45 g. Each suppository contains 25 mg of active substance.

We claim:

1. A compound selected from the group consisting of a compound of the formula

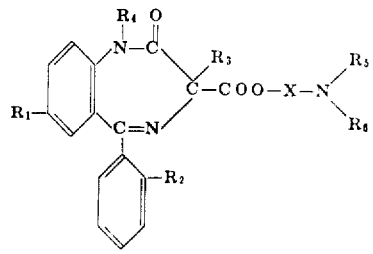

a compound of the formula

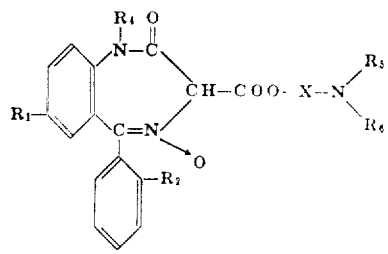

wherein X signifies an alkylene group containing from two to six carbon atoms; $R_1$ signifies halogen or nitro; $R_2$ signifies hydrogen or halogen; $R_3$ signifies hydrogen or hydroxy; $R_4$ signifies hydrogen, lower alkyl, lower alkoxy-lower alkyl, hydroxy-lower alkyl, or di-lower alkylamino-lower alkyl; $R_5$ signifies lower alkyl; $R_6$ signifies hydrogen or lower alkyl; or $R_5$ and $R_6$ taken together with the nitrogen atom joining them, signify a 5 or 6 membered heterocyclic ring selected from the group consisting of N-lower alkyl piperazinyl, pyrrolidinyl, piperazinyl, morpholino, and piperidino and pharmaceutically acceptable acid addition salts thereof.

2. A compound of claim 1 wherein the $R_1$ substituent is selected from the group consisting of chlorine or nitro.

3. A compound of claim 1 wherein the $R_2$ substituent is selected from the group consisting of chlorine, fluorine or hydrogen.

4. A compound of claim 1 wherein the $R_3$ substituent is hydrogen.

5. A compound of claim 1 wherein the $R_4$ substituent is selected from the group consisting of hydrogen, methyl or methoxy methyl.

6. A compound of claim 1 wherein the X substituent is selected from the group consisting of ethylene, propylene or the group

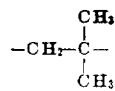

7. A compound of claim 1 wherein the $R_5$ and $R_6$ substituents are each methyl, ethyl, or taken together a morpholino group.

8. The compound of claim 1 wherein $R_1$ is chlorine, $R_2$ and $R_3$ are hydrogen, $R_4$ is methyl, $R_5$ and $R_6$ are each ethyl and X is propyl, i.e. 3-diethylaminopropyl 7-chloro-2,3-dihydro-1- methyl-2-oxo-5-phenyl-1H-1,4-benzodiazepine-3-carboxylate.

9. The compound of claim 1 wherein $R_1$ and $R_2$ are chlorine, $R_3$ and $R_4$ are hydrogen, $R_5$ and $R_6$ are each ethyl and X is propyl, i.e. 3-diethylaminopropyl 7-chloro-2,3-dihydro-2-oxo-5-(2-chlorophenyl)-1H-1,4-benzodiazepine-3-carboxylate.

10. The compound of claim 1 wherein $R_1$ is chlorine, $R_2$, $R_3$ and $R_4$ are hydrogen, $R_5$ and $R_6$ are methyl, and X is methylpropyl, i.e. 2-(dimethylamino)-2-methylpropyl 7-chloro-2,3-dihydro-2-oxo-5-phenyl-1H-1,4-benzodiazepine-3-carboxylate.

11. The compound of claim 1 wherein $R_1$ is nitro, $R_2$, $R_3$ and $R_4$ are hydrogen, $R_5$ and $R_6$ are each ethyl and X is propyl, i.e. 3-diethylaminopropyl 2,3-dihydro-7-nitro-2-oxo-5-phenyl-1H-1,4-benzodiazepine-3-carboxylate.

12. The compound of claim 1 wherein $R_1$ is chlorine, $R_2$, $R_3$ and $R_4$ are hydrogen, $R_5$ and $R_6$ taken together are morpholino and X is ethyl, i.e. 2-morpholinoethyl 7-chloro-5-phenyl-2,3-dihydro-2-oxo-1H-1,4-benzodiazepine-3-carboxylate.

13. The compound of claim 1 wherein $R_1$ is nitro, $R_2$ is chlorine, $R_3$ is hydrogen, $R_4$ is methyl, $R_5$ and $R_6$ taken together are morpholino, and X is propyl, i.e. 3-morpholinopropyl 7-nitro-5-(o-chlorophenyl)-2,3-dihydro-1-methyl-2-oxo-1H-1,4-benzodiazepine-3-carboxylate.

14. The compound of claim 1 wherein $R_1$ is nitro, $R_2$ is chlorine, $R_3$ is hydrogen, $R_4$ is methoxymethyl, $R_5$ and $R_6$ taken together are morpholino, and X is propyl, i.e. 3-morpholinopropyl 7-nitro-5-(o-chlorophenyl)-2,3-dihydro-1-methoxymethyl-2-oxo-1H-1,4-benzodiazepine-3-carboxylate.

15. The compound of claim 1 wherein $R_1$ is nitro, $R_2$ is chlorine, $R_3$ and $R_4$ are hydrogen, $R_5$ and $R_6$ taken together are morpholino, and X is propyl, i.e. 3-morpholinopropyl 7-nitro-5-(o-chlorophenyl)-2,3-dihydro-2-oxo-1H-1,4-benzodiazepine-3-carboxylate.

16. A compound of the formula

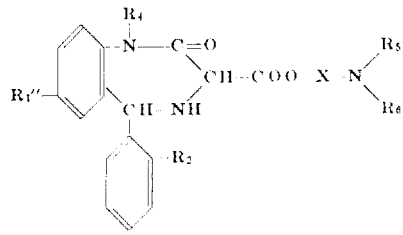

wherein $R_2$ signifies hydrogen or halogen; $R_4$ signifies hydrogen, lower alkyl, lower alkoxy-lower alkyl, hydroxy-lower alkyl, or di-lower alkylamino-lower alkyl; $R_5$ signifies lower alkyl; $R_6$ signifies hydrogen or lower alkyl; or $R_5$ and $R_6$ taken together with the nitrogen atom joining them, signify a five or six membered heterocyclic ring selected from the group consisting of N-lower alkyl piperazinyl, pyrrolidinyl, piperazinyl, morpholino, and piperidino; $R_1''$ signifies halogen; and X signifies an alkylene group containing from two to six carbon atoms.

* * * * *

UNITED STATES PATENT OFFICE
CERTIFICATE OF CORRECTION

Patent No. 3,671,518              Dated June 20, 1972

Inventor(s) Joseph Hellerbach, Andre Szente and Armin Walser

It is certified that error appears in the above-identified patent and that said Letters Patent are hereby corrected as shown below:

Formulas 1a and 1c not legible in Letters Patent

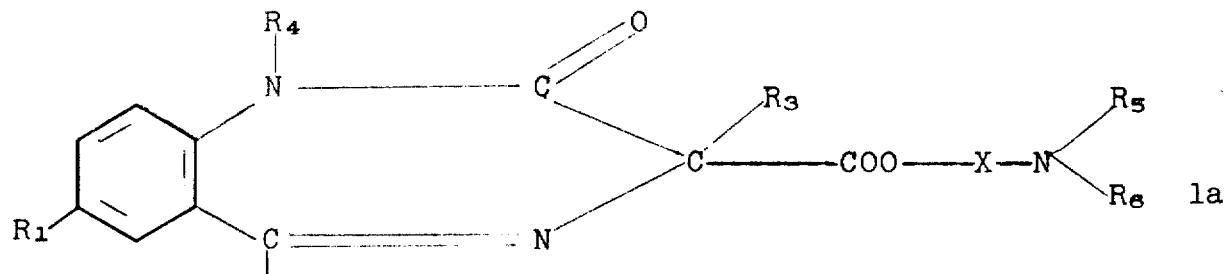

1a

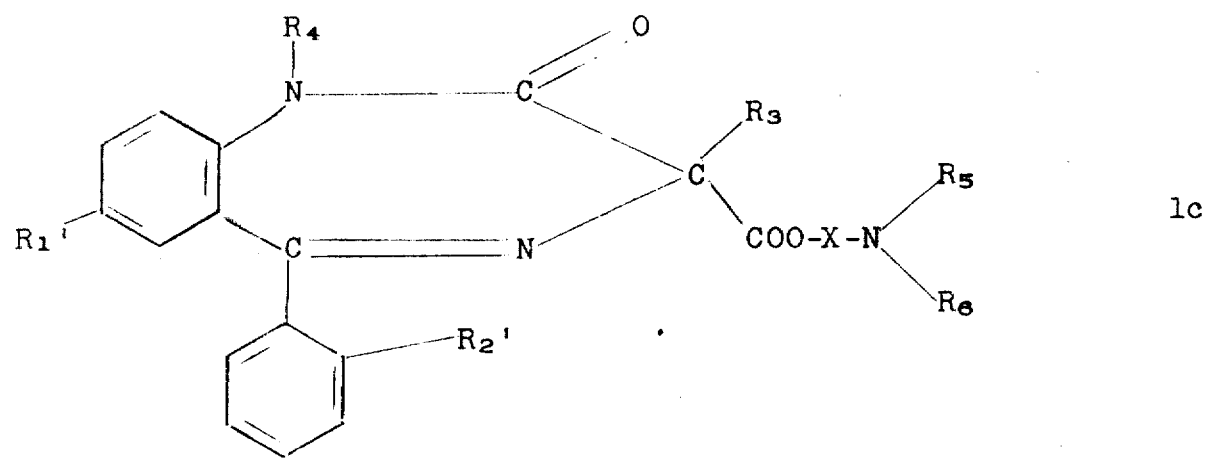

1c

UNITED STATES PATENT OFFICE
CERTIFICATE OF CORRECTION

Patent No. 3,671,518          Dated June 20, 1972

Inventor(s) Joseph Hellerbach, Andre Szente and Armin Walser

It is certified that error appears in the above-identified patent and that said Letters Patent are hereby corrected as shown below:

Column 6, lines 49-60

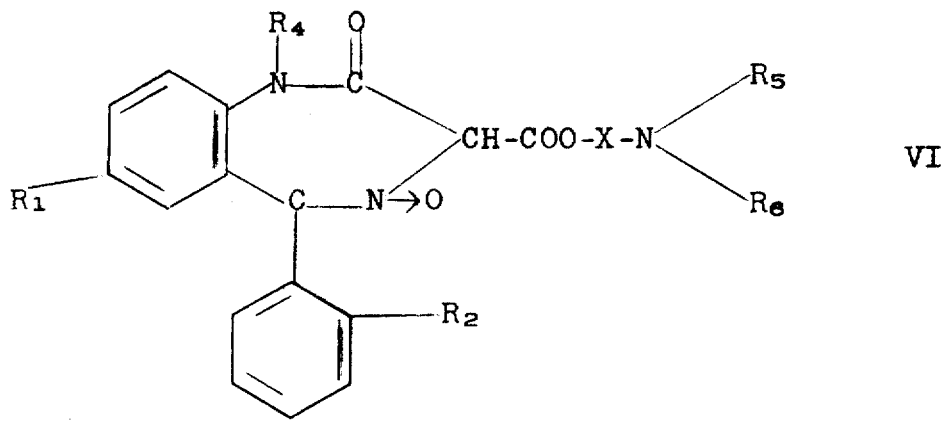

should be

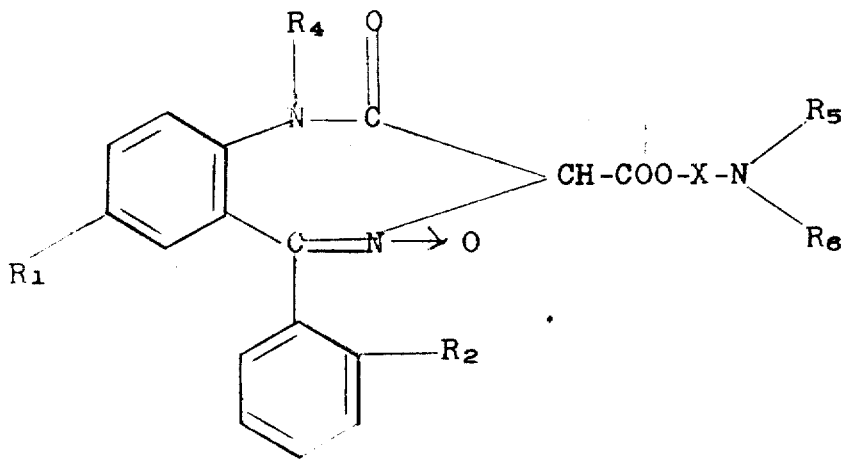

UNITED STATES PATENT OFFICE
CERTIFICATE OF CORRECTION

Patent No. 3,671,518          Dated

Inventor(s) Hellerbach, Szente and Walser

It is certified that error appears in the above-identified patent and that said Letters Patent are hereby corrected as shown below:

Column 12, line 45

"Compounds of formulas" should be

Compounds of formulae

Column 13, line 9

"(o-chlorophenyl)dihydro" should be (o-chlorophenyl)-2,3-dihydro

Column 16, line 18

"methylamino]thyl" should be methylamino]ethyl

Signed and sealed this 9th day of January 1973.

(SEAL)
Attest:

EDWARD M. FLETCHER, JR.          ROBERT GOTTSCHALK
Attesting Officer          Commissioner of Patents